United States Patent Office
2,770,642
Patented Nov. 13, 1956

2,770,642

PREPARATION OF BETA-HYDROXY-BETA-PHENYL-PROPIONITRILE AND CINNAMONITRILE

Robert S. Montgomery, Midland, Mich., assignor to The Dow Chemical Company, Midland, Mich., a corporation of Delaware No Drawing. Application May 11, 1953,
Serial No. 354,425

4 Claims. (Cl. 260—465)

This invention pertains to a new and improved method of preparation of beta-hydroxy-beta-phenylpropionitrile and of cinnamonitrile.

Previously known methods of preparation of beta-hydroxy-beta-phenylpropionitrile and of cinnamonitrile have been disadvantageous in one or more respects, e. g. in the use of expensive or rare starting materials, costly reagents, low yields, tedious operational steps, poor quality of product, or inadaptability to large-scale production.

It is the object of this invention to provide an improved method of making beta-hydroxy-beta-phenylpropionitrile and cinnamonitrile. A particular object is to provide such a method which permits an economical, large-scale production of the beta-hydroxy-beta-phenylpropionitrile and of the cinnamonitrile in good yield from readily available starting materials and reagents by convenient steps of operation. Other objects and advantages of the invention will be evident from the following description.

It has now been found that cinnamonitrile can be made in an economical and relatively simple manner by a reaction between styrene halohydrins and alkali metal cyanides with the formation of beta-hydroxy-beta-phenyl-propionitrile and dehydration of the latter, provided that the reactions, particularly the dehydration reaction, are carried out in the manner and under the conditions hereinafter set forth. If desired, the process can be interrupted and beta-hydroxy-beta-phenylpropionitrile be obtained as a product.

The term "styrene halohydrin" is used herein as referring to alpha-(halomethyl)benzyl alcohols, especially alpha-(chloromethyl)benzyl alcohol and alpha-(bromomethyl)benzyl alcohol.

In the first step of the method, approximately equimolecular amounts of a styrene halohydrin, e. g. alpha-(chloromethyl)benzyl alcohol or alpha-(bromomethyl)-benzyl alcohol, and an alkali metal cyanide, e. g. sodium cyanide or potassium cyanide, are reacted, preferably in a lower alcohol such as methanol, ethanol, propanol, isopropanol, etc. The kind and proportion of alcohol used is not critical since it serves merely as a convenient medium for the reaction in which the organic products of the reaction are soluble and from which the inorganic products, i. e. the alkali metal halide, largely precipitates. Since the alkali metal cyanides are only slightly soluble in the reaction mixture, there is usually used such an amount of alcohol that the mixture can be readily stirred, usually an amount approximately equal to or greater than the weight of the styrene halohydrin charged.

The reaction mixture, i. e. the mixture of the styrene halohydrin and alkali metal cyanide in alcohol, is stirred thoroughly, preferably in a vessel equipped with a reflux condenser. The reaction between the styrene halohydrin and the alkali metal cyanide is exothermic and the temperature of the mixture usually rises unless cooling is applied. The temperature may be allowed to rise to the boiling point of the alcohol, refluxing of which moderates the reaction, or cooling may be applied to control the temperature below the reflux temperature, but preferably not below about 20° C.

The time required for the reaction to be completed varies inversely with the temperature; in ethanol at a reflux temperature of about 81–82° C., the reaction is substantially complete after about 3 hours, whereas approximately 90 hours are required at room temperature, i. e. at about 25° C.

The reaction mixture is thereafter cooled, e. g. to room temperature, and the insoluble, largely inorganic solid, mostly alkali metal halide, is separated from the liquid portion of the mixture.

The reaction product comprises the intermediate beta-hydroxy-beta-phenylpropionitrile which may be isolated therefrom, if desired.

The beta-hydroxy-beta-phenylpropionitrile can conveniently be isolated from the liquid portion of the above-described reaction product by fractional distillation. Usually, the lower-boiling alcohol solvent is removed at atmospheric pressure and the higher-boiling residue is fractionated under reduced pressure. There are usually obtained thereby a minor amount of styrene oxide, a minor amount of unreacted styrene halohydrin, a major amount of the beta-hydroxy-beta-phenylpropionitrile and a small amount of tarry residue. The beta-hydroxy-beta-phenyl-propionitrile is collected in a fraction which distills at temperatures of from about 133° to about 135° C. at 1 mm. absolute pressure. The yield of beta-hydroxy-beta-phen-ylpropionitrile so obtained is usually from 70 to 80 percent of theoretical based on the styrene halohydrin charged and from 75 to 85 percent based on the styrene halohydrin consumed in the reaction. The actual yield of beta-hydroxy-beta-phenylpropionitrile in the unfractioned crude reaction product is somewhat higher than the yield upon isolation, a minor amount being lost in the recovery step.

Cinnamonitrile can be made by dehydration of the beta-hydroxy-beta-phenylpropionitrile either in the form of the pure material, e. g. isolated by fractional distillation as hereinbefore described, or in the form of the crude product of reaction of the styrene halohydrin and the alkali metal cyanide. If purified beta-hydroxy-beta-phenylpropionitrile is used, it is first dissolved or diluted with a lower alcohol, such as methanol, ethanol, propanol or isopropanol. The proportion of alcohol is not critical and may be from about $\frac{1}{10}$ to several times the weight of beta-hydroxy-beta-phenylpropionitrile mixed therewith. If the crude, unfractionated beta-hydroxy-beta-phenylpropionitrile in the form of the reaction product is to be used in the dehydration reaction, the alcohol solution from which the undissolved solids have been separated may be used as such or part of the alcohol may first be removed by distillation if desired.

To the alcoholic solution of the beta-hydroxy-beta-phenylpropionitrile is added a small amount of a strong inorganic alkali, preferably an alkali metal hydroxide such as sodium hydroxide or potassium hydroxide or an alkali metal such as metallic sodium or potassium. The alkali metals may be first converted to alkali metal alcoholates or alkoxides by reaction with alcohol and added as a solution of the metal alkoxides in alcohol.

The alkali should be present in amount chemically equivalent to from about 0.5 to about 5, preferably from about 0.7 to about 2, parts by weight of alkali metal hydroxide per 100 parts of the beta-hydroxy-beta-phenyl-propionitrile. The amount of alkali charged may need to be larger when a crude reaction product is used as starting material for the dehydration reaction, because some of the strong alkali added is consumed by reaction with by-products, e. g. ammonium halides or ammonium carboxylates, present in the crude material. An amount of alkali should be added which will provide free alkali in the proportions previously stated.

When the alkaline alcoholic solution of the beta-hydroxy-beta-phenylpropionitrile is heated, cinnamonitrile is formed by a dehydration reaction. The presence of alkali and the proportion thereof are critically important. If there is used less than about 0.5 parts by weight of alkali as alkali metal hydroxide per 100 parts of beta-hydroxy-beta-phenylpropionitrile, the rate of the dehydration reaction and the yield of cinnamonitrile is reduced. Little or no cinnamonitrile is produced in the absence of free alkali, excessively high temperatures causing only general decomposition. On the other hand, more than about 5 parts by weight of alkali as alkali metal hydroxide per 100 parts of the beta-hydroxy-beta-phenylpropionitrile is also objectionable because, in the presence of such quantities of alkali, an excessive amount of tarry decomposition products and lower yields of cinnamonitrile are obtained. Although the kind and proportion of alcohol used does not appear to be critical, the presence of an alcohol during the dehydration reaction appears to be necessary, since, in the absence of alcohol, low yields are obtained, even in the presence of an optimum proportion of alkali.

The preferred procedure is to heat the alkaline alcoholic solution of beta-hydroxy-beta-phenylpropionitrile under reflux at atmospheric pressure for a period of from ½ to several hours. Thereafter, the alcohol is distilled off at atmospheric pressure and the higher-boiling mixture is fractionally distilled, preferably under reduced pressure. Most of the dehydration reaction takes place during this distillation, the cinnamonitrile product being stripped off as it is formed while keeping the higher boiling reactants in the reaction zone. It is desirable in the fractional distillation to employ an efficient fractionating column and to operate with considerable reflux in the column so as to effect the best possible separation of cinnamonitrile from the other components of the mixture. It is also desirable to operate under a pressure such that the cinnamonitrile distills from the mixture at a temperature in the range of from about 100° to 150° C. Such temperatures appear to promote the dehydration reaction without causing excessive general decomposition. Distillation pressures necessary to provide such temperatures depend on the vapor pressure and boiling point of cinnamonitrile, e. g. to distill cinnamonitrile at about 111–112° C. requires about 3.5 mm. pressure.

Cinnamonitrile boils lower than beta-hydroxy-beta-phenylpropionitrile and consequently is distilled away from the reaction mixture, if an efficient fractionation column is used under high reflux. The cinnamonitrile distillate may be further refined, e. g. by another fractional distillation, if desired. A minor amount of unreacted beta-hydroxy-beta-phenylpropionitrile is usually recovered, and a small amount of tarry residue is obtained.

The yield of cinnamonitrile is usually from about 60 to 70 percent of the theoretical yield based on the beta-hydroxy-beta-phenylpropionitrile charged. The overall yield of cinnamonitrile based on the styrene halohydrin starting material is usually from about 50 to about 60 percent of theory.

The invention will now be illustrated by an example which should not be construed as limiting the invention. In the example, parts and percentages are by weight unless otherwise indicated.

*Example*

Beta - hydroxy - beta - phenylpropionitrile and cinnamonitrile were prepared from styrene chlorohydrin, i. e. alpha-(chloromethyl)benzyl alcohol, as follows.

A reaction mixture was prepared containing: 480 grams (2.85 g-moles) styrene chlorohydrin (assay 93%), 150 grams (3.0 g-moles) sodium cyanide, 900 cc. ethanol (95%, denatured).

The reaction mixture was stirred in a vessel open to the atmosphere only through a reflux condenser and was gently warmed. The temperature rose to about 81–82° C. and was maintained thereat with very slow reflux of the alcohol for about 3 hours. The reaction mixture was then allowed to cool to room temperature and to stand overnight. The solid material (mostly sodium chloride) was removed by filtration, and the liquid material was distilled.

The major portion of the alcohol was distilled off at atmospheric pressure. The higher-boiling liquid product was fractionally distilled at a reduced pressure of about 1.1 mm. There were thereby obtained approximately 40.8 grams of styrene oxide, 18.2 grams recovered styrene chlorohydrin, 321 grams beta-hydroxy-beta-phenylpropionitrile (boiling at about 133 to 135° C. at 1.1 mm. pressure) and a small amount of tarry residue. The amount of beta-hydroxy-beta-phenylpropionitrile obtained corresponds to about 76.6 percent of the theoretical yield based on the amount of styrene chlorohydrin charged to the reaction and to about 80 percent of the theoretical yield based on the amount of styrene chlorohydrin consumed by the reaction.

A portion of the beta-hydroxy-beta-phenylpropionitrile obtained by the above procedure was dehydrated as follows.

A reaction mixture comprising: 300 grams of beta-hydroxy-beta-phenylpropionitrile, 100 cc. of ethanol (95%, denatured), and 3 grams sodium hydroxide was mixed in a distillation vessel provided with an efficient fractionating column. The mixture was heated to boiling and was refluxed at atmospheric pressure for about ½ hour. The bulk of the alcohol was then distilled off at atmospheric pressure and the higher boiling liquid was fractionally distilled at a reduced pressure of about 3.5 mm. The low-boiling materials (residual alcohol, water, etc.) were carefully removed until the boiling point of cinnamonitrile was reached. Thereafter, the distillation was made slowly, with considerable reflux being returned to the column. The rate of taking off distilled condensate was adjusted to maintain the column temperature near the boiling point of cinnamonitrile, i. e. at approximately 111° to 112° C. at 3.5 mm. pressure, until no more distillate could be so obtained. Thereafter a higher-boiling fraction comprising beta-hydroxy-beta-phenylpropionitrile was distilled leaving an undistilled residue. There was recovered about 20 grams of unreacted beta-hydroxy-beta-phenylpropionitrile. The principal fraction was 191 grams of crude cinnamonitrile. The crude cinnamonitrile was redistilled, whereby 150 grams of pure cinnamonitrile was obtained, coresponding to 61 percent of the theoretical yield based on the amount of beta-hydroxy-beta-phenylpropionitrile consumed in the reaction. The amount of purified cinnamonitrile obtained also corresponds to about 49 percent of the theoretical yield based on the amount of styrene chlorohydrin which was consumed in the process.

I claim:

1. A method which comprises heating beta-hydroxy-beta-phenylpropionitrile with a strong alkali of the class consisting of the alkali metal hydroxides and the alkali metal alkoxides, the alkali being present in an amount corresponding to from 0.5 to 5.0 parts by weight as alkali metal hydroxide per 100 parts of the beta-hydroxy-beta-phenylpropionitrile, in the presence of a lower saturated aliphatic alcohol, removing the alcohol by distillation and distilling cinnamonitrile from the reaction mixture at a pressure corresponding to a distillation temperature of from about 100° C. to about 150° C.

2. A method for making cinnamonitrile from an alpha-(halomethyl)benzyl alcohol which comprises making beta-hydroxy-beta-phenylpropionitrile by reacting an alpha-(halomethyl)benzyl alcohol with an alkali metal cyanide in approximately equimolecular proportions in the presence of a lower aliphatic alcohol at a reaction temperature between about 20° C. and the atmospheric boiling point of the reaction mixture, thereafter heating the beta-hydroxy-beta-phenylpropionitrile with a strong alkali of the class consisting of the alkali metal hydroxides and the alkali metal alkoxides, the alkali being present in an amount corresponding to from 0.5 to 5.0 parts by weight as alkali metal hydroxide per 100 parts of the beta-hydroxy-beta-phenylpropionitrile, in the presence of a lower saturated aliphatic alcohol, removing the alcohol by distillation and distilling cinnamonitrile from the reaction mixture at a pressure corresponding to a distillation temperature of from about 100° C. to about 150° C.

3. A method for making cinnamonitrile from alpha-(chloromethyl)benzyl alcohol which comprises reacting alpha-(chloromethyl)benzyl alcohol with an approximately equimolecular proportion of sodium cyanide in the presence of ethyl alcohol at a reaction temperature between about 20° C. and the atmospheric boiling point of the reaction mixture to form beta-hydroxy-beta-phenylpropionitrile, thereafter heating the beta-hydroxy-beta-phenylpropionitrile with from 0.5 to 5.0 percent of its weight of sodium hydroxide in the presence of ethyl alcohol at the atmospheric boiling point of the reaction mixture, removing the ethyl alcohol by distillation and distilling cinnamonitrile from the reaction mixture at a pressure corresponding to a distillation temperature of from about 100° C. to about 150° C.

4. A method for making cinnamonitrile from alpha-(chloromethyl)benzyl alcohol which comprises reacting alpha-(chloromethyl)benzyl alcohol with an approximately equimolecular proportion of sodium cyanide in the presence of ethyl alcohol at the atmospheric boiling point of the reaction mixture, separating beta-hydroxy-beta-phenylpropionitrile from the reaction mixture, thereafter heating the beta-hydroxy-beta-phenylpropionitrile with from 0.5 to 5.0 percent of its weight of sodium hydroxide in the presence of ethyl alcohol at the atmospheric boiling point of the reaction mixture, removing the ethyl alcohol by distillation and distilling cinnamonitrile from the reaction mixture at a pressure corresponding to a distillation temperature of from about 100° C. to about 150° C.

References Cited in the file of this patent

UNITED STATES PATENTS

| | | |
|---|---|---|
| 2,304,537 | Cambron | Dec. 8, 1942 |
| 2,307,700 | Moore | Jan. 5, 1943 |
| 2,311,636 | Britton | Feb. 23, 1943 |
| 2,478,990 | Walker | Aug. 16, 1949 |
| 2,500,403 | Davis et al. | Mar. 14, 1950 |
| 2,503,710 | Bruson | Apr. 11, 1950 |
| 2,570,050 | Eby | Oct. 2, 1951 |